(No Model.)

C. J. GIBSON.
CLUTCH.

No. 259,527. Patented June 13, 1882.

WITNESSES:
Thos Houghton
Edw. T. W. Byrn

INVENTOR:
C. J. Gibson
BY
ATTORNEYS.

UNITED STATES PATENT OFFICE.

CHARLES J. GIBSON, OF BERGEN POINT, NEW JERSEY.

CLUTCH.

SPECIFICATION forming part of Letters Patent No. 259,527, dated June 13, 1882.

Application filed May 13, 1882. (No model.)

*To all whom it may concern:*

Be it known that I, CHARLES J. GIBSON, of Bergen Point, in the county of Hudson and State of New Jersey, have invented a new and Improved Clutch; and I do hereby declare that the following is a full, clear, and exact description of the same, reference being had to the accompanying drawings, forming part of this specification, in which—

Figure 1:
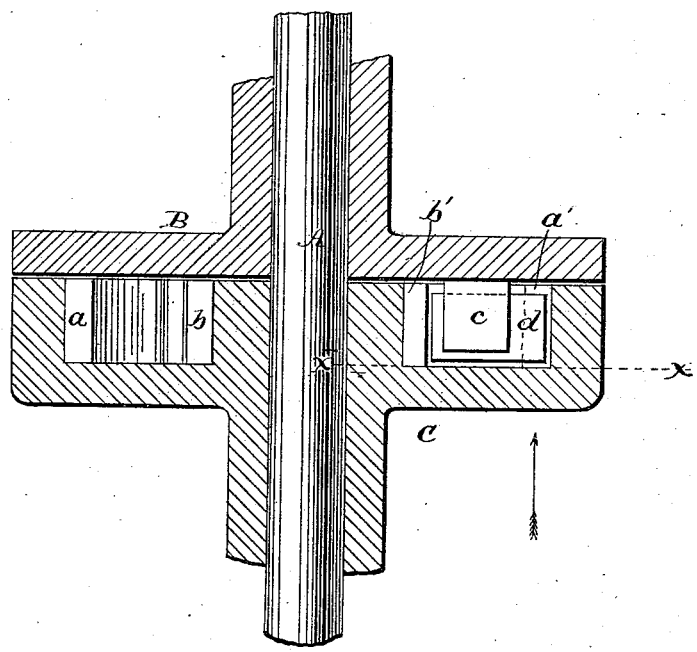
Figure 2:
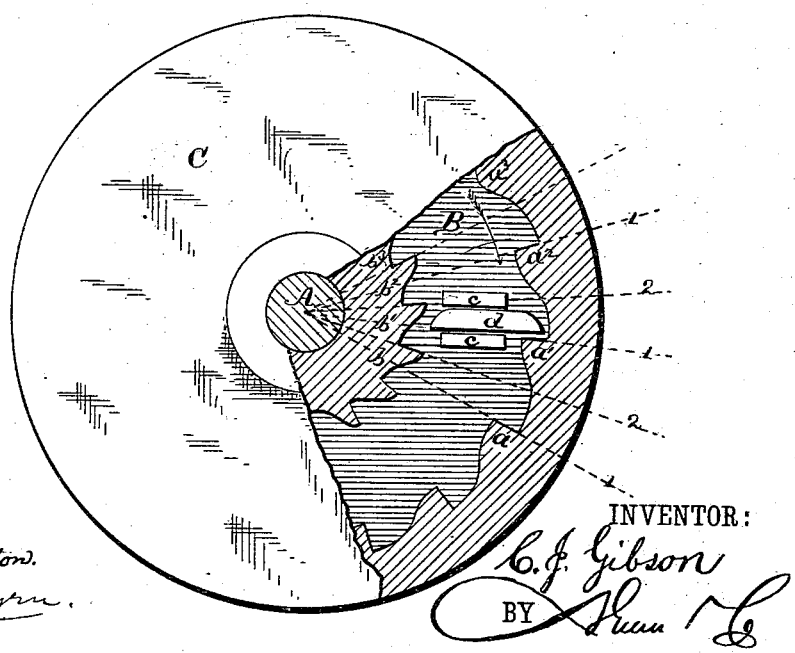

Figure 1 is a section through the clutch, taken parallel to its axis. Fig. 2 is a side view, partly in section through the line $x\ x$.

My invention relates to an improved form of rotary clutch, in which the driving-section couples to and imparts motion to the driven section when rotated in one direction, but when rotated in the other direction moves independently of the driven section.

It consists in two clutch-sections, one of which has two sets of ratchet-teeth projecting toward each other, one set projecting inwardly and the other outwardly, and both lying in the same plane, and the teeth of one set alternating with the radial lines of the teeth of the other set, while the other clutch-section has a radially-arranged and freely-sliding dog or catch, which vibrates in a radial line between the two sets of ratchet-teeth when the driving-section is moving backward, but engages with a quick and positive movement either one or the other of the series of ratchet-teeth on the driven section when said driving-section is moved forward.

In the drawings, A represents a shaft upon which the two clutch-sections B and C are mounted and free to revolve. One of these clutch-sections, B, is provided with two guide-lugs, $c\ c$, between which is retained in radial position the freely-sliding dog or catch $d$, beveled at both ends upon the same side. The other clutch-section, C, is formed with an inwardly-projecting set of ratchet-teeth, $a\ a'\ a^2$, &c., near its outer periphery, and with an outwardly-projecting set of ratchet-teeth, $b\ b'\ b^2$, at its hub, both of which sets of ratchets lie in the same plane and incline in the same direction. These ratchet-teeth, it will be seen, have in both sets their right-line faces on the same side of the tooth; but the radial right-line faces of the teeth of one set are intermediate to the radial right-line faces of the teeth in the other set. Thus the right-line faces of the teeth $a\ a'\ a^2$ are coincident with the radial lines 1 1, while the right-line faces of the teeth $b\ b'\ b^2$ are coincident with the radial lines 2 2, which alternate with 1 1. Now, the length of the radially-sliding dog or catch $d$ is greater than the distance from the apex of a tooth of one series to the apex of the tooth of the other series, so that, no matter what the position of the dog $d$ may be, the motion of the clutch-section B in the direction of the arrow in Fig. 2 will cause either one or the other of the ends of the dog $d$ to strike against the right-line faces of either the teeth $a\ a'\ a^2$, &c., or $b\ b'\ b^2$, according to the position of the said dog. The length of this dog, however, is such that when it is on one of the right-line faces of a tooth, or has one end in a notch between two teeth, as between $a'$ and $a^2$, as shown, then its other end escapes the apex of the nearest tooth $b'$ of the other series for any backward movement—that is to say, while a forward movement of the section B, as indicated by the arrow, causes dog $d$ to engage one of the two sets of ratchet-teeth and turn the other clutch-section, C, for a reverse movement of section B, the dog vibrates simply in a radial line independently of the clutch-section C, and the said dog, moving against incline of $a^2$, is projected into the notch between $b'$ and $b^2$, so as to escape tooth $a^2$, and then bearing against the incline of $b^2$ is projected into the notch between $a^2$ and $a^3$, so as to escape tooth $b^2$, and so on.

It will be seen, therefore, from the foregoing that while the sections B and C are disconnected for movement in one direction they are quickly and positively engaged without lost motion for movement in the opposite direction, doing away entirely with springs and all jamming action.

Having thus described my invention, what I claim as new is—

1. A clutch consisting of the combination of two rotary sections, one of which has two sets of ratchet-teeth, $a$ and $b$, with the right-line faces of one set in different radial lines from those of the other set, and the other of which sections carries a radially-vibrating dog, *d*, arranged in the plane of the ratchet-teeth of the other section, as and for the purpose described.

2. The clutch-section B, having guide-lugs *c c* and dog *d*, with beveled end faces, in combination with the clutch-section C, having two sets of ratchet-teeth, *a* and *b*, with the teeth of one set alternating radially with those of the other section, substantially as and for the purpose set forth.

CHARLES JONES GIBSON.

Witnesses:
E. F. WHITE,
CORNELIUS DUNLEA.